UNITED STATES PATENT OFFICE.

FRIEDRICH RASCHIG AND MAX KÖBNER, OF LUDWIGSHAFEN-ON-THE-RHINE, GERMANY, ASSIGNORS TO FRIEDRICH RASCHIG, OF LUDWIGSHAFEN-ON-THE-RHINE, GERMANY.

PROCESS FOR THE MANUFACTURE OF CHLORINATED PHENOL ESTERS AND OF OXYBENZYL ALCOHOLS, OXYBENZALDEHYDES, AND OXYBENZOIC ACIDS.

1,023,758.     Specification of Letters Patent.     Patented Apr. 16, 1912.

No Drawing.     Application filed May 15, 1909. Serial No. 496,300.

*To all whom it may concern:*

Be it known that we, FRIEDRICH RASCHIG and MAX KÖBNER, manufacturing chemists, subjects of the German Emperor, residing at Ludwigshafen-on-the-Rhine, Germany, have invented certain new and useful improvements in processes for the manufacture of chlorinated phenol esters and of oxybenzyl alcohols, oxybenzaldehydes, and oxybenzoic acids, of which the following is a specification.

If phenols having side-chains, such as cresols and xylenols, are treated with chlorin or other chlorinating media, the chlorin, according to the observations hitherto made, will usually enter the benzene nucleus. We have found, that the chlorin will completely or almost completely enter the side chains, if inorganic or organic acid residues are introduced into the hydroxyl group of the phenol. Specially suitable for this purpose are the esters of carbonic and of phosphoric acid, which can be easily produced from phosgene or phosphorus-oxychlorid and the corresponding phenols. The same result may be obtained by introducing the radical of the phosphorus acid or of the benzene-sulfonic acid or of an alphyl-sulfonic acid. The esters are melted in an enameled or lead-lined receptacle and heated to a temperature between 150 to 180°. Into this liquid is introduced chlorin, which has a substituting effect on the hydrogen atoms of the methyl groups, 1, 2 or 3 hydrogen atoms of the methyl group being gradually replaced by chlorin, according to the quantity introduced, while the corresponding quantity of hydrochloric acid escapes. In this manner the esters of substituted benzyl chlorids, benzal chlorids and benzotrichlorids may be obtained, which are intended to be used in the dyeing industry, perfumery and pharmacy. The principal importance of the present process, however, consists in the fact, that by the saponification of these chlorination products, the same being boiled in alcoholic solution with caustic soda, the alcohol distilled off and acid added for the purpose of binding the soda, oxybenzyl alcohols, oxybenzaldehydes and oxybenzoic acids may be easily obtained, thus providing a simple method of deriving these products from easily available and cheap cresols, xylenols and similar materials.

The conversion of the chlorinated esters into alcohols, aldehydes, acids during saponification takes place, for instance, in the manner indicated by the following equations:

a. $CO(O.C_6H_4CH_2Cl)_2 + 2H_2O = 2C_6H_4 \begin{cases} OH \\ CH_2OH \end{cases} + 2HCl + CO_2$
    Oxybenzylchlorid carbonate.    Oxybenzyl-alcohol.

b. $CO(O.C_6H_4CHCl_2)_2 + 3H_2O = 2C_6H_4 \begin{cases} OH \\ CHO \end{cases} + 4HCl + CO_2$
    Oxybenzylidene chlorid carbonate.    Oxybenzaldehyde.

c. $CO(O.C_6H_4CCl_3)_2 + 4H_2O = 2C_6H_4 \begin{cases} OH \\ COOH \end{cases} + 6HCl + CO_2$
    Oxybenzotrichlorid carbonate.    Oxybenzoic acid.

By treating 242 kilos of O-cresol-carbonate with chlorine at 180° C. until the weight has increased by 69 kilos, and allowing the product to cool, w-monochlor-o-cresol-carbonic acid ester

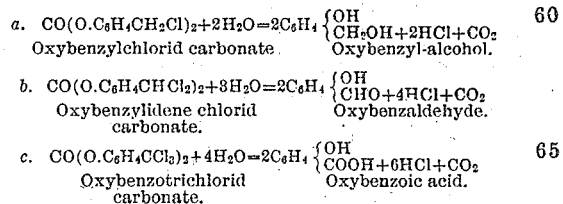

is obtained. It is boiled with water and an excess of calcium carbonate at 4–5 atmospheres pressure, whereby at the same time carbonic acid is split off and the chlorin is replaced by the hydroxyl-group. From the solution filtered off the calcium carbonate, the o-oxybenzyl-alcohol crystallizes out.

Example I: 242 kilograms of orthocresol-carbonate are treated with chlorin gas at 180° C. until an increase of weight amounting to 138 kilograms has taken place. The result is a thick oil, which at the pressure of 30 millimeters mercury column may be distilled at 247° C. and the principal part of which consists of dichlor-orthocresol-carbonic acid ester. The reaction takes place according to the following equation:

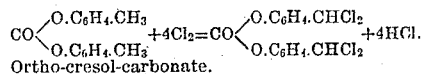

Ortho-cresol-carbonate.

On complete (exhaustive) saponification it yields salicylic-aldehyde about 80% of the theoretical quantity.

Example II: 242 kilograms of paracresol-carbonate are treated with chlorin, as described in Example I. The reaction takes place according to the following example:

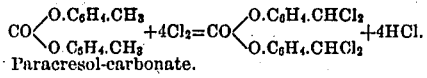

The dichlor-paracresol-carbonate thus produced solidifies in the cold, when re-crystallized from alcohol, it has a melting point of 108° C., and on saponification it yields about 80 per cent. of the theoretically possible quantity of para-oxybenzaldehyde.

Example III: 242 kilograms of metacresol-carbonate are treated with chlorin at 150° C. until the increase of weight amounts to 207 kilos. The resulting oil is trichlor-metacresol-carbonate, for on saponification it yields meta-oxybenzoic acid. The formation of the trichlor-metacresol-carbonate takes place according to the equation:

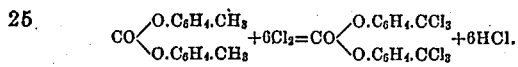

Example IV: 368 kilograms of ortho-cresol-phosphate obtained by prolonged boiling of phosphorus-oxychlorid (one molecular proportion) and ortho-cresol (three molecular proportions) are treated with chlorin at 160 to 180° C. until the weight has increased by 207 kilos. The reaction takes place according to the equation:

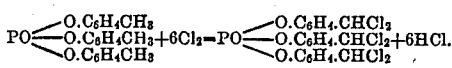

The oil obtained in this manner yields on saponification about 50 per cent. of the theoretically possible quantity of salicylic-aldehyde.

Example V: For the manufacture of ortho-cresol-phosphorous acid ester 324 kilos of ortho-cresol are mixed with 137.5 kilos of phosphorus trichlorid. The formation of the ester takes place at first spontaneously, while liberating hydrochloric acid and is continued by heating to 180° for about two hours. As soon as the escape of hydrochloric acid ceases, the reaction is completed. Into the ester obtained chlorin is introduced. At first a separation of crystals will be noticed, owing to the formation of an additive compound, viz:— tricresyl-phosphate-chlorid $(CH_3.C_6H_4O)_3PCl_2$. This product, however, is soon melted by the heat of the reaction, whereupon chlorin is admitted at a temperature of 150 to 180° C. until the weight has increased by 93 kilos. The result is a thick oil consisting mainly of ortho-oxybenzylidene chlorid-phosphate-chlorid $(CHCl_2.C_6H_4O)_3PCl_2$ and yielding on saponification salicylic-aldehyde about 50% of the theoretical quantity. The transformation takes place according to the equations:

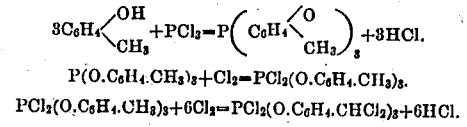

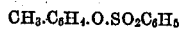

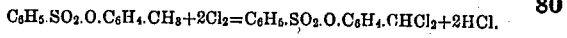

Example VI: 264 kilograms of ortho-cresol-benzene-sulfonic acid ester $$CH_3.C_6H_4.O.SO_2.C_6H_5$$

are treated with chlorin at 150 to 180° C. until an increase of weight of 69 kilos has taken place. The interaction takes place substantially according to the equation:

$$C_6H_5.SO_2.O.C_6H_4.CH_3 + 2Cl_2 = C_6H_5.SO_2.O.C_6H_4.CHCl_2 + 2HCl.$$

The resulting oil, consisting largely of the benzene-sulfonic acid ester of ortho-oxybenzylidene-chlorid, yields on exhaustive saponification salicylic aldehyde, about 80% of the theoretical quantity.

Example VII, (manufacture of salicylic aldehyde:) 192 kilograms of ortho-oxybenzylidene-chlorid-phosphoric acid ester are dissolved in 2,000 liters of alcohol and boiled with a concentrated aqueous solution of 160 kilos of caustic soda for a quarter of an hour on the reflux-cooler. The saponification takes place according to the equation:

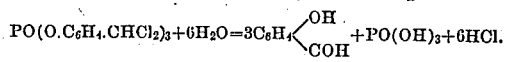

After the alcohol has been distilled off, the sodium compound of salicylic aldehyde is decomposed by an excess of sulfuric acid and the salicylic aldehyde is distilled off with steam.

What we claim is:—

1. The process for the manufacture of phenols oxidized in the side chain, which consists in treating the acid-esters of the homologues of phenol with a chlorinating agent at an increased temperature, and causing saponifying agents to act on the phenol-esters thus obtained and chlorinated in the aliphatic side-chain.

2. The process for the manufacture of phenol-esters chlorinated in the side-chain, which consists in introducing an acid-radical into the hydroxyl group of the said phenol and treating the ester thus produced with chlorin.

3. The process for the manufacture of phenol-esters chlorinated in the side-chain, which consists in introducing an acid-radical into the hydroxyl group of the said phenol, melting the ester thus produced and treating it with a chlorin at an increased temperature.

4. The process for the manufacture of phenol-esters chlorinated in the side-chain, which consists in introducing an acid-radical into the hydroxyl group of the said phenol, melting the ester thus produced and treating it with chlorin at a temperature of 150 to 130

180° C. until the desired increase of weight has been produced.

5. The process for obtaining chemical compounds from phenols having side-chains, which consists in introducing an acid-radical into the hydroxyl group of the said phenol, treating the ester thus produced with chlorin and saponifying the product.

6. The process for obtaining chemical compounds from phenols having side-chains, which consists in introducing an acid-radical into the hydroxyl group of the said phenol, melting the ester thus produced, treating it with chlorin at an increased temperature and saponifying the product.

7. The process for obtaining chemical compounds from phenols having side-chains, which consists in introducing an acid-radical into the hydroxyl group of the said phenol, melting the ester thus produced and treating it with chlorin at a temperature of 150 to 180° C. until the desired increase of weight has been produced and saponifying the product of chlorination, substantially as described.

In testimony whereof we have hereunto set our hands in presence of two subscribing witnesses.

FRIEDRICH RASCHIG.
MAX KÖBNER.

Witnesses:
 ROBERT GERLACH,
 A. T. MITTON.